United States Patent [19]

Rowlette

[11] 3,720,869

[45] March 13, 1973

[54] BATTERY CELL STRUCTURE AND METHOD OF DETERMINING STATE OF CHARGE

[75] Inventor: John J. Rowlette, Arcdia, Calif.

[73] Assignee: Hughes Aircraft Company, Culver City, Calif.

[22] Filed: Aug. 18, 1970

[21] Appl. No.: 64,718

[52] U.S. Cl. ................................. 324/29.5, 136/182
[51] Int. Cl. .............................................. G01n 27/42
[58] Field of Search ........... 324/29.5, 62; 136/3, 182; 320/48

[56] References Cited

UNITED STATES PATENTS 2,988,590   6/1961   Andre .................................. 136/182

Primary Examiner—Michael J. Lynch
Attorney—James K. Haskell and Alton V. Oberholtzer

[57] ABSTRACT

The method of directly determining or monitoring a state-of-charge or condition of an electrode contained in an electric cell and modified cell structure provided therefor by making a resistance measurement in a direction at right angles to the interface between the electrode and a separator. The method provides a measure of the conductivity or resistance of an electrode in a cell assembly. The measurement is taken of the resistance of a cell electrode, preferably the anode, by its conversion between a metallic and non-metallic phase during the course of its charge or discharge.

3 Claims, 3 Drawing Figures

PATENTED MAR 13 1973 3,720,869

John J. Rowlette,
INVENTOR.
BY.
Alton U. Oberholtzer

ATTORNEY

PATENTED MAR 13 1973                    3,720,869

BATTERY CELL STRUCTURE AND METHOD OF DETERMINING STATE OF CHARGE

PRIOR ART

The problem of determining the state-of-charge or cell potential of an electrode in a mercury cell, or primary mercury batteries, after a period of storage or use, has long been unsolved and the nearest approach is known attempts to correlate state-of-charge in nickel-cadmium cells with cell potential while the cell undergoes charge or discharge. There is no known prior art which modifies a battery structure to directly and physically determine an electrode's conductivity value, and the usual method of determining storage condition is to select a few and tear them apart for possible predictable comparison.

SUMMARY OF THE INVENTION

According to this invention, or improvement, battery or cell structures of the type of standard mercury cells are provided with an auxiliary terminal through which monitoring or measurement of the state-of-charge condition of the individual electrode can be made through measurement of its change of resistance. The change of resistance is correlated with an electrode's change of state by conversion of a metal to metal oxide (or vice versa).

DESCRIPTION OF A PREFERRED EMBODIMENT

Figure 1:
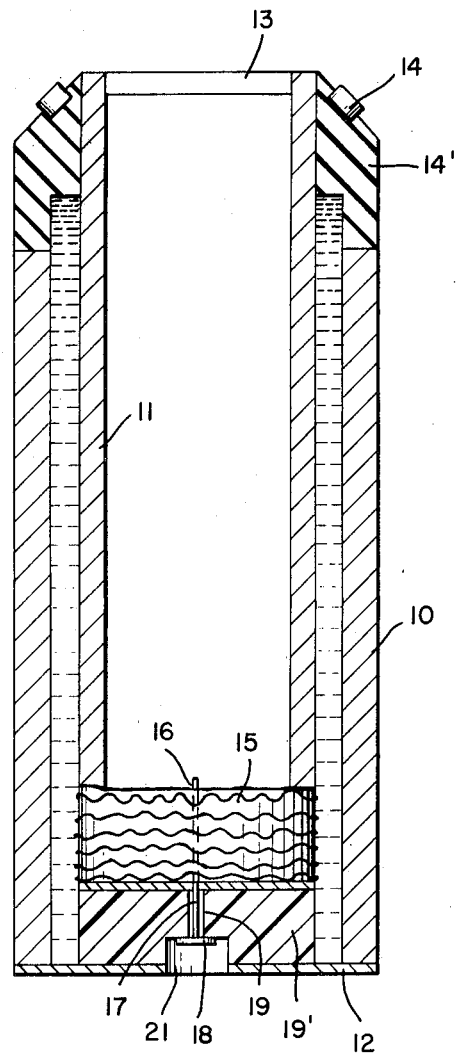
FIG. 1 is a partial cross-sectional view illustrating the electrodes of a modified mercury cell of cylindrical shape provided with the improvement described herein.

Referring to FIG. 1, the electrodes of a standard mercury cell of the cylindrical type are shown modified by the addition of an auxiliary terminal. For example, the cylindrical positive mercury electrode 10 is enclosed in a sealed container with an electrolyte (not shown), and encircles a negative zinc electrode 11 in spaced insulated relationship thereto. As the cylindrical mercury cell is presently fashioned, the closure end 12 (shown in part) provides a positive terminal contact at one end of positive electrode 10 and forms an enclosure end for a sealed insulation container (not shown). The negative terminal 13 of the zinc electrode 11 is provided at the opposite end of the container in conventional insulated relationship to positive cathode 10. For example, a plastic or nonconductor ring of insulation 14 illustratively separates the negative electrode 11 and terminal 13 from the positive electrode 10. The space of 14' may be open or filled with insulation. Thus far, the arrangement is of conventional structure.

To provide my preferred modification, a supplementary conductor strip 15, preferably of inert nonreactive metal as silver or copper, and in wire, mesh or screen form, is wrapped about the negative electrode 11. Attached to the conductor 15 is a contact 16 which is connected by an insulated lead 17 to terminal conductor 18. The lead or conductor 17 extends through a fluid tight packing (not shown) in an aperture 19 of conventional synthetic plastic or rubber insulation 19'. The insulation 19' separates the negative electrode 11 from the positive terminal end and container end closure plate 12. The conductor closure end 12 (shown in part) provides a container end closure which serves as the positive terminal and is provided with an aperture 21. In alignment with the aperture 21, the insulation 19' is cut out or depressed to provide a countersunk area for maintaining the terminal 18 out of short circuitry contact with the positive terminal 12.

By the above modification of structural arrangement, and as hereinafter described, I have provided a method and means for readily determining the electrical condition or relative usefulness of an electrode encased within a battery cell without need for dismantling or destruction of the cell. In an electrolyte solution KOH, for example, of a mercury cell, the conversion of the zinc electrode to zinc oxide is from its outer periphery inwardly and by connecting a proper reading or measuring means to the respective terminals 13 and 18 a direct measurement of the extent of discharge of the cell electrode 11 is taken.

Alternatively, the conductor 15 may be wrapped about the positive electrode 10 (not shown) and an auxiliary terminal (as 18) provided in insulated relationship to terminals 12 and 18. Thereby is provided an auxiliary positive terminal electrode (not shown) for connecting its opposite sides to a proper reading instrumentation thereto and positive terminal 12 for directly measuring the electrical value of the positive cathode while encased in the cell or battery form. In other words, in this arrangement, the terminal 18 is in insulated relationship to terminal 12 and the reading of electrode 10 is obtained by connecting the measuring instrument to contact terminal 18 and terminal 12. In this modification the terminals may be in flush relationship or in the same plane, separated by insulation.

For example, a suitable conventional measuring means can be a Wheatstone bridge (not shown) which measures the electrode's resistance in its contained condition in the cell or battery form. Otherwise, or alternatively, a current may be run through either electrode and the voltage drop of the electrode independently measured.

Figure 3:
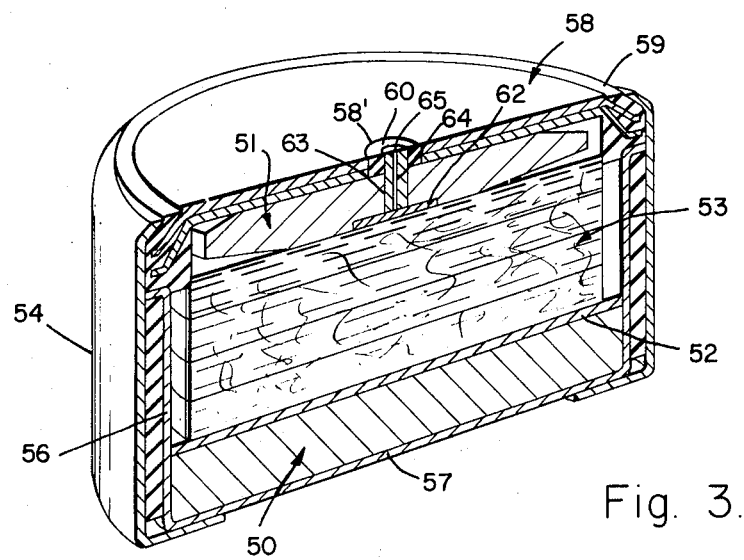
FIG. 3 is a further modification of FIG. 1 showing flat battery cell structure provided with a modified state-of-charge sensor.
Figure 2:
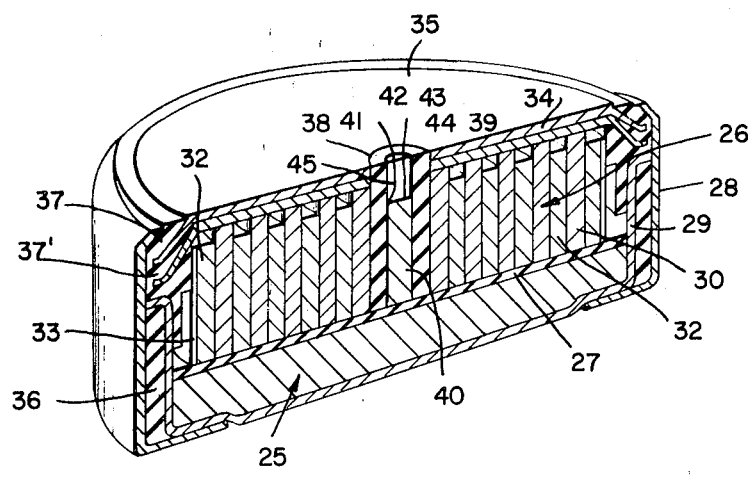
FIG. 2 is a modification of FIG. 1 showing a wound type electrode structure provided with the improvement described herein.

Other battery or cell structure of the character of FIGS. 2 and 3, with further modification, can be provided as herein described.

For example, the roll type cell or battery structure, partially illustrated in FIG. 2 is an arrangement of positive (mercuric) electrode 25 and wound zinc electrode 26 maintained in spaced relationship to each other by an inert electrolyte absorbent barrier 27. The conventional cell structure is provided with a nonconductor outer open top can form 28 containing inner open top conductor can form 29 supporting the mercuric electrode 25. The electrode 26 is a wound or rolled film of conventional zinc-plated bronze 30 and alkaline absorbent spacer 32. A retaining ring 33 encircles one or more electrolyte absorbent rings 32 and the wound electrode film 30. One or more retaining conductor contacts, or conductor contact ring 34, overlay the zinc electrode 26. The container closure 35 overlays the contact 34 and serves as the negative terminal. An adapter sleeve of insulating material 36 is inserted between the outer can body 28 and the inner can body 29. A rubber or plastic material of conventional insulation provides a cell seal (grommet) 37 in combination with a similar insulating material 37' provides insulating packing about the terminal ends of container cover 35 and the ends of contact 34.

A plastic packing of conventional insulating material, as rubber or plastic, provides the cell seal 37 and also insulating packing 37' about the terminal ends of the anode conductor 35 and conductor contact 34. Thus far, this arrangement is of conventional mercury cell structure.

The modification provided is to cut an aperture 38 through cover 35 and, if necessary, through the contact 34. The aperture 38 is preferably centered with the inner core of the electrode 26. Inserted within the aperture 38 is an insulation ring 39 of rubber, plastic, or the like and within which is positioned an auxiliary electrode 40. The electrode 40 must be of the same material as the wound or rolled form of anode or electrode material, of which the reading is obtained. An insulated cap 41 having mounted therein or thereon conductor contacts 42 and 43 closes the aperture 38 and maintains the contacts 42 and 43 at the level of the normal anode closure cover 35. An insulated conductor 44 connects one side of electrode 40 with terminal 43. Another insulated conductor 45 connects the opposite side of electrode 40 with terminal 42.

By suitably attaching or connecting a conventional resistance measuring instrumentation to the contacts 42 and 43, an independent reading of the resistance of electrode 40 provides a comparable determination of the state-of-charge of electrode body 26.

FIG. 3 illustrates a further modification of a flat pellet structure wherein the mercuric oxide electrode 50 is in spaced relationship to the zinc electrode 51. The mercuric oxide electrode is separated from the zinc electrode by a porous insulation barrier 52 and a body of absorbent and alkaline electrolyte material 53. This electrode structure is a standard arrangement and comprises an outer can body 54 containing an insulation adapter sleeve 55 supporting an inner can body 56. The base 57 of the inner can body 56, in contact with the positive electrode 50, provides a positive terminal and a container end closure 58, in contact with the zinc electrode, and provides a contact of opposite polarity to that of base 57. A packing ring 59 serves to provides a cell seal of insulation material in which the terminal ends of the end closure 58 are sealed. As indicated, this structure is of conventional character and of the relatively flat structural arrangement provided for mercury cells and batteries.

The modification herein provided is to cut an aperture 58' in the negative terminal enclosure member 58 and preferably close the aperture with a closure cap or insulation material 60. In this instance, the terminals 58 and 65 are preferably at the same level but are insulated one from the other. In some instances the terminal 65 may be in countersunk relationship to the terminal 58.

The further modification provided for this structure is to position or insert a conductor strip 62 of suitable metal, as silver or copper, along one side of zinc electrode 51. An aperture 63 is provided through the electrode 51 and an insulated conductor wire 64 passes through the aperture 63 and is connected at one end to the conductor strip 62. The insulated wire 64 is connected at its opposite end to exposed insulated terminal 65. The terminal 65 is insulated from the terminal 58 in order to obtain a reading when a suitable measuring instrument is properly connected to the terminals 58 and 65.

Alternatively, the conductor and terminal arrangements, above described, may less preferably be similarly provided on the opposite electrode 50 and likewise connected to an independent insulated positive terminal (not shown). A corresponding reading obtained by connecting a conventional Wheatstone bridge or other suitable tester between the similarly separate insulated positive terminals enable reading the electrical value of the mercuric oxide or the positive electrode.

In each instance the arrangements provided enable measuring the resistance across the electrode in a direction or at angles, and preferably at right angles to the interface between the electrode to be measured and a separator. Since a current follows lines of least resistance, the effect will be to determine the resistance across the electrode at right angles to the interface.

Having described and illustrated the present embodiment of this invention, improvement and/or discovery in the art in accordance with the patent statutes, it will be apparent that some modifications and variations of the embodied components, as claimed, may be made without departing from the spirit and scope thereof. The specific embodiments described are given by way of examples illustrative of the changes and improvement discovered applicable herein and which are to be construed or limited only by the terms of the appended claims.

What is claimed is:

1. The method of measuring the condition of a battery cell containing enclosed electrodes, comprising an anode electrode, a cathode electrode, and an auxiliary electrode in contact with one of said electrodes, and independent terminals for each of said electrodes, the steps consisting of:
   a. connecting a resistance tester to a terminal of one of said electrodes contained within the battery cell and a terminal of said auxiliary electrode; and
   b. measuring the resistance across the electrode and the auxiliary electrode in a direction at right angles to the interface between the one of said electrodes and said auxiliary electrode.

2. The method of claim 1 wherein at least one of the said electrodes is a zinc electrode in contact with an auxiliary electrode and a resistance tester is connected to the opposite sides of the auxiliary electrode and the zinc electrode in contact therewith.

3. The method of determining the condition of an electrode in a closed battery cell containing a multiple of separate electrodes having separate exposed terminals of like and unlike polarity in an insulated relationship to each other and with two of said electrodes in said battery in interfacial contact, the steps consisting of:
   a. connecting a resistance measuring means to the separate terminals of like polarity of said two contacting electrodes; and b. measuring the resistance across the electrodes and obtaining a comparative measure of the resistance of the one of the said electrodes in interfacial contact.

* * * * *